United States Patent
Rao et al.

(10) Patent No.: US 10,094,920 B2
(45) Date of Patent: Oct. 9, 2018

(54) RANGE RESOLUTION IN FMCW RADARS

(71) Applicant: Texas Instruments Incorporated, Dallas, TX (US)

(72) Inventors: Sandeep Rao, Bangalore (IN); Karthik Subburaj, Bangalore (IN); Brian Ginsburg, Allen, TX (US); Karthik Ramasubramanian, Bangalore (IN); Jawaharlal Tangudu, Bangalore (IN); Sachin Bharadwaj, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 721 days.

(21) Appl. No.: 14/470,414

(22) Filed: Aug. 27, 2014

(65) Prior Publication Data

US 2016/0061942 A1    Mar. 3, 2016

(51) Int. Cl.
*G01S 13/58* (2006.01)
*G01S 13/34* (2006.01)
*G01S 7/35* (2006.01)
*G01S 13/93* (2006.01)

(52) U.S. Cl.
CPC ............ *G01S 13/583* (2013.01); *G01S 7/35* (2013.01); *G01S 13/343* (2013.01); *G01S 2013/9314* (2013.01)

(58) Field of Classification Search
CPC ... G01S 13/34–13/347; G01S 13/583–13/584; G01S 7/35; G01S 2013/9314
See application file for complete search history.

(56) References Cited

U.S. PATENT DOCUMENTS

| | | | | |
|---|---|---|---|---|
| 3,355,734 A * | 11/1967 | Albanese | ............. | G01S 13/282 342/129 |
| 5,963,163 A * | 10/1999 | Kemkemian | .......... | G01S 13/34 342/109 |
| 6,633,815 B1 * | 10/2003 | Winter | ................. | G01S 13/956 342/107 |
| 6,646,587 B2 * | 11/2003 | Funai | ..................... | G01S 13/26 342/137 |
| 7,786,927 B2 * | 8/2010 | Kondoh | ................... | G01S 7/35 342/109 |

(Continued)

FOREIGN PATENT DOCUMENTS

| | | |
|---|---|---|
| EP | 1918736 | 5/2008 |
| WO | 2014075838 | 5/2014 |

*Primary Examiner* — Matthew M Barker
(74) *Attorney, Agent, or Firm* — John R. Pessetto; Charles A. Brill; Frank D. Cimino

(57) ABSTRACT

The disclosure provides a radar apparatus for estimating a range of an obstacle. The radar apparatus includes a local oscillator that generates a first ramp segment and a second ramp segment. The first ramp segment and the second ramp segment each includes a start frequency, a first frequency and a second frequency. The first frequency of the second ramp segment is equal to or greater than the second frequency of the first ramp segment when a slope of the first ramp segment and a slope of the second ramp segment are equal and positive. The first frequency of the second ramp segment is equal to or less than the second frequency of the first ramp segment when the slope of the first ramp segment and the slope of the second ramp segment are equal and negative.

25 Claims, 3 Drawing Sheets

(56) References Cited

U.S. PATENT DOCUMENTS

| | | | |
|---|---|---|---|
| 7,982,661 B2* | 7/2011 | Beasley | G01S 7/354 342/118 |
| 8,026,843 B2* | 9/2011 | Winkler | G01S 7/4008 342/109 |
| 8,704,704 B2* | 4/2014 | Luebbert | G01S 13/343 342/104 |
| 8,797,208 B2* | 8/2014 | Stirling-Gallacher | G01S 13/34 342/179 |
| 9,024,809 B2* | 5/2015 | Testar | G01S 7/35 342/109 |
| 9,063,225 B2* | 6/2015 | Lee | G01S 13/345 |
| 9,354,304 B2* | 5/2016 | Kirsch | G01S 13/58 |
| 9,557,412 B2* | 1/2017 | Hilsebecher | G01S 7/352 |
| 9,739,879 B2* | 8/2017 | Rohling | G01S 13/582 |
| 2010/0245154 A1* | 9/2010 | Szajnowski | G01S 7/023 342/90 |
| 2010/0289692 A1* | 11/2010 | Winkler | G01S 7/4008 342/70 |
| 2015/0084806 A1* | 3/2015 | Rohling | G01S 13/345 342/109 |
| 2017/0023670 A1* | 1/2017 | Jansen | G01S 7/354 |

\* cited by examiner

RANGE RESOLUTION IN FMCW RADARS

TECHNICAL FIELD

Embodiments of the disclosure relate generally to communication antennas and more particularly to an antenna unit in radars that assists in vehicle parking.

BACKGROUND

A vehicle has parking sensors to detect an obstacle behind the vehicle. The parking sensors determine a distance of the vehicle from the obstacle using ultrasonic signals when backing a vehicle. The parking sensor operates at ultrasonic frequencies. The parking sensor outputs an ultrasonic detecting signal to detect whether any obstacle is behind the rear of the vehicle and receives an ultrasonic signal as reply from the obstacle. A vehicle generally requires multiple parking sensors to cover the entire rear of the vehicle which makes it a cost intensive solution. Also, the ultrasonic parking sensors use a time division obstacle detecting method in which each sensor sends and receives ultrasonic detect signal in a defined time slot. Thus, the process of detecting obstacles using ultrasonic sensors is time consuming which is unsafe in vehicles moving with high velocity.

Ultrasonic parking sensors require the measurement and drilling of holes in the vehicle's bumper to install transducers. There are risks associated with drilling and mounting the transducers into the bumper. The performance of the Ultrasonic sensors is sensitive to temperature and atmospheric conditions such as snow and rain. The performance of ultrasonic sensors is severely degraded when the sensors are covered with snow. In addition, the range over which the ultrasonic sensors operates is limited.

The use of radars in automotive applications is evolving rapidly. Radars do not have the drawbacks discussed above in the context of ultrasonic sensors. Radar finds use in number of applications associated with a vehicle such as collision warning, blind spot warning, lane change assist, parking assist and rear collision warning. Pulse radar and FMCW (Frequency Modulation Continuous Wave) radar are predominately used in such applications. In the pulse radar, a signal in the shape of a pulse is transmitted from the radar at fixed intervals. The transmitted pulse is scattered by the obstacle. The scattered pulse is received by the radar and the time difference between the start of transmission of the pulse and the start of reception of the scattered pulse is proportional to a distance of the radar from the target. For better range resolution, a narrower pulse is used which requires a high sampling rate in an ADC (analog to digital converter) used in the pulse radar. In addition, sensitivity of a pulse radar is directly proportional to the power which complicates the design process of the pulse radar.

In an FMCW radar, a transmit signal is frequency modulated to generate a ramp segment. An obstacle scatters the ramp segment to generate a received signal. The received signal is received by the FMCW radar. A signal obtained by mixing the ramp segment and the received signal is termed as an IF (intermediate frequency) signal. The frequency of the IF signal is proportional to the distance of the obstacle from the FMCW radar. The IF signal is sampled by an analog to digital converter (ADC). A sampling rate of the ADC is proportional to the maximum frequency of the IF signal and the maximum frequency of the IF signal is proportional to the range of a farthest obstacle which can be detected by the FMCW radar.

The range is the distance of the obstacle from the FMCW radar. Thus, unlike in the pulse radar, the sampling rate of the ADC in the FMCW radar is independent of the range resolution. Typically in an FMCW radar, multiple identical ramp segments are transmitted in a unit called as frame. Range resolution defines the capability of the FMCW radar to resolve closely spaced objects. The range resolution is directly proportional to a bandwidth of the transmitted ramp segment. Also, the transmitted ramp is required to meet the phase noise specifications that are needed for achieving the desired performance levels. However, it is difficult, because of hardware limitations, for a local oscillator in the FMCW radar to generate a ramp segment with a wide bandwidth and simultaneously meeting the phase noise specifications. Thus, it is important for the FMCW radar to transmit a wide bandwidth ramp segment for high range resolution and at the same time maintaining optimum performance level and accuracy.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a radar apparatus. The radar apparatus is used for estimating a range of an obstacle of one or more obstacles. The radar apparatus includes a local oscillator that generates a first ramp segment and a second ramp segment. The first ramp segment and the second ramp segment each includes a start frequency, a first frequency and a second frequency. The first frequency of the second ramp segment is equal to or greater than the second frequency of the first ramp segment when a slope of the first ramp segment and a slope of the second ramp segment are equal and positive. The first frequency of the second ramp segment is equal to or less than the second frequency of the first ramp segment when the slope of the first ramp segment and the slope of the second ramp segment are equal and negative.

A transmit antenna unit is coupled to the local oscillator and configured to transmit the first ramp segment and the second ramp segment. A range resolution of the radar apparatus using the first ramp segment and the second ramp segment together is less than the range resolution of the radar apparatus using the first ramp segment and the second ramp segment independently.

Another embodiment provides a method of estimating a range of an obstacle of one or more obstacles with a radar apparatus. A first ramp segment and a second ramp segment are transmitted. The first ramp segment and the second ramp segment, each comprising a start frequency, a first frequency and a second frequency. The first frequency of the second ramp segment is equal to or greater than the second frequency of the first ramp segment when a slope of the first ramp segment and a slope of the second ramp segment are equal and positive. The first frequency of the second ramp segment is equal to or less than the second frequency of the first ramp segment when the slope of the first ramp segment and the slope of the second ramp segment are equal and negative.

The first ramp segment and the second ramp segment are scattered by the one or more obstacles to generate the first received signal and the second received signal respectively. The first ramp segment and the first received signal are mixed to generate a first IF (intermediate frequency) signal, and the second ramp segment and the second received signal are mixed to generate a second IF signal. The first IF signal is sampled to generate a first valid data and the second IF signal is sampled to generate a second valid data. A data is formed from the first valid data and the second valid data. A range resolution obtained from processing of the data is lesser than the range resolution obtained from the processing of the first valid data and the processing of the second valid data independently.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
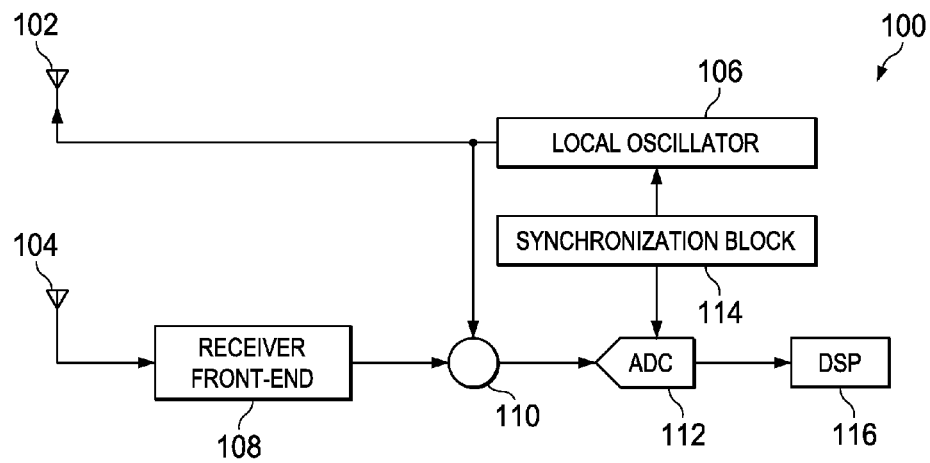
FIG. 1 illustrates a radar apparatus, according to an embodiment.

FIG. 1 illustrates a radar apparatus 100, according to an embodiment. In one example, the radar apparatus 100 is used for estimating a range of an obstacle of one or more obstacles. The radar apparatus 100 includes a transmit antenna unit 102 and a receive antenna unit 104. In an example, a single antenna unit functions as the transmit antenna unit 102 and the receive antenna unit 104. A local oscillator 106 is coupled to the transmit antenna unit 102. A receiver front-end 108 is coupled to the receive antenna unit 104.

A mixer 110 is coupled to the local oscillator 106 and the receiver front-end 108. An analog to digital converter (ADC) 112 is coupled to the mixer 110. A synchronization block 114 is coupled to the local oscillator 106 and the ADC 112. A digital signal processor (DSP) 116 is coupled to the ADC 112. The radar apparatus 100 may include one or more additional components known to those skilled in the relevant art and are not discussed here for simplicity of the description.

The operation of the radar apparatus 100 illustrated in FIG. 1 is explained now. The local oscillator 106 generates a plurality of ramp segments. The plurality of ramp segments includes a first ramp segment and a second ramp segment. A slope of each ramp segment of the plurality of ramp segments generated by the local oscillator 106 is same. Therefore, a slope of the first ramp segment is equal to a slope of the second ramp segment. In an example, the local oscillator 106 includes a PLL (phase locked loop) that generates the first ramp segment and the second ramp segment.

In one example, a frequency of the ramp segments generated by the local oscillator 106 is digitally controlled by a register. In another example, the register controls a value of divide-by-N which is used in a feedback loop of the local oscillator 106. In a further example, the local oscillator 106 includes a first voltage controlled oscillator (VCO) and a second VCO that generates the first ramp segment and the second ramp segment respectively. In yet another example, a PLL includes the first VCO and the second VCO generating the first ramp segment and the second ramp segment respectively.

In an additional example, the local oscillator 106 includes a plurality of VCO's that generates a plurality of ramp segments. A time difference between generation of the first ramp segment and the second ramp segment includes a time taken in the local oscillator 106 to switch from the first VCO to the second VCO. In an example, the local oscillator 106 has a plurality of VCO's and each VCO has a predefined operating frequency range. The operating frequency range of each VCO of the plurality of VCO's is either contiguous or overlapping. Only one VCO of the plurality of VCO's is operational at a time instant.

A multiplexer is used, in one example, to select which VCO should operate at a given time instant. In another example, the local oscillator 106 includes a voltage controlled oscillator (VCO). The VCO includes a first tuning element and a second tuning element that generates the first ramp segment and the second ramp segment respectively. The operation of the local oscillator 106 is further explained later in the description with the help of FIG. 2 to FIG. 5.

The transmit antenna unit 102 transmits the first ramp segment and the second ramp segment. The first ramp segment and the second ramp segment are scattered by the one or more obstacles to generate a first received signal and a second received signal respectively. The receive antenna unit 104 receives the first received signal and the second received signal. In one version, the first received signal includes a plurality of delayed versions of the first ramp segment and the second received signal includes a plurality of delayed versions of the second ramp segment.

In another version, when the plurality of ramp segments are transmitted by the transmit antenna unit 102, the receive antenna unit 104 receives a plurality of received signals. The receiver front-end 108 amplifies the first received signal and the second received signal. The mixer 110 mixes the first ramp segment and the first received signal to generate a first IF (intermediate frequency) signal. Also, the mixer 110 mixes the second ramp segment and the second received signal to generate a second IF signal.

Each ramp segment includes a start frequency, a first frequency and a second frequency. Therefore, the first ramp segment and the second ramp segment each include the start frequency, the first frequency and the second frequency. In an example, the first frequency is less than the second frequency. A round trip delay is defined as a time difference between start of transmission of a ramp segment and start of reception of the corresponding received signal from an obstacle of the one or more obstacles. A maximum round trip delay is defined as a time difference between start of transmission of the first ramp segment and start of reception of the first received signal from a farthest obstacle of the one or more obstacles.

The farthest obstacle is an extreme obstacle which can be detected by the radar apparatus 100. The start frequency is less than the first frequency by at least a product of an absolute value of the slope of the first ramp segment and the maximum round trip delay when the slope of the first ramp segment and the second ramp segment are equal and positive. The start frequency is greater than the first frequency by at least a product of an absolute value of the slope of the first ramp segment and the maximum round trip delay when the slope of the first ramp segment and the second ramp segment are equal and negative.

In one example, the first frequency of the second ramp segment is equal to or greater than the second frequency of the first ramp segment when the slope of the first ramp segment and a slope of the second ramp segment are equal and positive. In another example, the first frequency of the second ramp segment is equal to or less than the second frequency of the first ramp segment when the slope of the first ramp segment and a slope of the second ramp segment are equal and negative.

The ADC 112 samples the first IF signal from a time instant when the first ramp segment is at the first frequency to a time instant when the first ramp segment is at the second frequency. The ADC 112 generates a first valid data from sampling of the first IF signal. The synchronization block 114 provides a data valid signal to the ADC 112 from the time instant when the first ramp segment is at the first frequency to the time instant when the first ramp segment is at the second frequency i.e. the synchronization block 114 provides the data valid signal to the ADC 112 during sampling of the first IF signal.

The ADC 112 also samples the second IF signal from a time instant when the second ramp segment is at the first frequency to a time instant when the second ramp segment is at the second frequency. The ADC 112 generates a second valid data from sampling of the second IF signal. The synchronization block 114 provides a data valid signal to the ADC 112 from the time instant when the second ramp segment is at the first frequency to the time instant when the second ramp segment is at the second frequency i.e. the synchronization block 114 provides the data valid signal to the ADC 112 during sampling of the second IF signal.

The DSP 116 further processes the first valid data and the second valid data to estimate a range of the obstacle of the one or more obstacles. The DSP 116 processes a data formed from the first valid data and the second valid data such that a range resolution obtained from processing of the data is less than the range resolution obtained from the processing of the first valid data and the processing of the second valid data independently. It is to be noted that the range resolution is defined as a smallest distance between two obstacles that is resolvable by the radar apparatus 100.

For example a radar apparatus with a range resolution of 5 cm is better than a radar apparatus with a range resolution of 10 cm. Thus, performance of a radar apparatus with a less resolution is better. In one example, the range resolution obtained from the processing of the data corresponds to at least a sum of a bandwidth of the first ramp segment and a bandwidth of the second ramp segment. The range resolution of a radar apparatus 100 is inversely proportional to the bandwidth and is defined as:

$$R = c/2B$$

where, B is the bandwidth of a signal transmitted by the radar apparatus 100 and c is the speed of light. In another example, the bandwidth of the first ramp segment is B1 and the bandwidth of the second ramp segment is B2, the range resolution of the radar apparatus 100 is defined as:

$$R = c/2(B+B2)$$

In one example, B1 is equal to B2. In another example, the range resolution of the radar apparatus 100 is a function of the bandwidth of the first ramp segment and the bandwidth of the second ramp segment. In an additional example, the range resolution of the radar apparatus 100 is inversely proportional to the difference between the second frequency of the second ramp segment and the first frequency of the first ramp segment. In an embodiment, the DSP 116 further processes a plurality of valid data received from the ADC 112 to estimate range of the one or more obstacles. The operation of the DSP 116 is explained later in the description.

Figure 2:
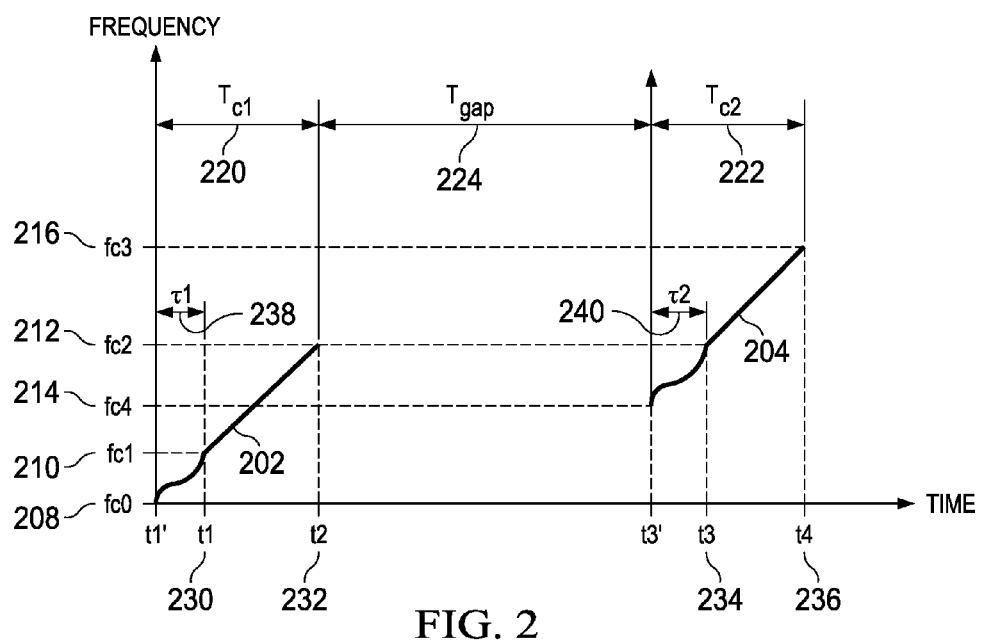
FIG. 2 illustrates waveforms generated by a local oscillator as a function of time, in a radar apparatus, according to an embodiment.

FIG. 2 illustrates waveforms generated by a local oscillator 106 as a function of time, in a radar apparatus, according to an embodiment. The waveforms illustrated in FIG. 2 are illustrated in connection with the radar apparatus 100. The local oscillator 106 generates a plurality of ramp segments. The plurality of ramp segments includes a first ramp segment 202 and a second ramp segment 204. A slope of the first ramp segment 202 is equal to a slope of the second ramp segment 204. In one example, the slope of the first ramp segment 202 is not equal to the slope of the second ramp segment 204. In another example, the local oscillator 106 is a PLL (phase locked loop) that generates the first ramp segment 202 and the second ramp segment 204.

In yet another example, a PLL includes the first VCO and the second VCO generating the first ramp segment 202 and the second ramp segment 204 respectively. The first ramp segment 202 has a start frequency fc0 208, a first frequency fc1 210 and a second frequency fc2 212. The second ramp segment 204 has a start frequency fc4 214, a first frequency fc2 212 and a second frequency fc3 216. It is to be noted that the second frequency fc2 212 of the first ramp segment 202 is equal to the first frequency fc2 212 of the second ramp segment 204.

In one example, the first frequency fc2 212 of the second ramp segment 204 is equal or greater than the second frequency fc2 212 of the first ramp segment 202. In another example, the local oscillator 106 includes a first voltage controlled oscillator (VCO) and a second VCO that generates the first ramp segment 202 and the second ramp segment 204 respectively. In an additional example, the local oscillator 106 includes a plurality of VCO's that generates a plurality of ramp segments. In yet another example, the local oscillator 106 includes a voltage controlled oscillator (VCO). The VCO includes a first tuning element and a second tuning element that generates the first ramp segment 202 and the second ramp segment 204 respectively.

In an example, a round trip delay is defined as a time difference between start of transmission of a ramp segment and start of reception of the corresponding received signal from an obstacle of the one or more obstacles. A maximum round trip delay is defined as a time difference between start of transmission of the first ramp segment 202 and start of reception of the first received signal from a farthest obstacle of the one or more obstacles. The farthest obstacle is an extreme obstacle which can be detected by the radar apparatus 100.

The start frequency is less than the first frequency by at least a product an absolute value of the slope of the first ramp segment 202 and the maximum round trip delay when the slope of the first ramp segment 202 and the second ramp segment 204 are equal and positive. The start frequency is greater than the first frequency by at least a product of an absolute value of the slope of the first ramp segment 202 and the maximum round trip delay when the slope of the first ramp segment 202 and the second ramp segment 204 are equal and negative. The time Tc1 220 defines a duration of the first ramp segment 202 and the time Tc2 222 defines a duration of the second ramp segment 204. In one example, Tc1 220 is equal to Tc2 222.

The time Tgap 224 includes a time taken in the local oscillator 106 to switch from the first VCO to the second VCO or to switch from the first tuning element to the second tuning element. In one example, the time Tgap 224 includes a time required for the local oscillator 106 to settle after switching from the first VCO to the second VCO or from the first tuning element to the second tuning element. The time Tgap 224 also represents a time difference between generation of the first ramp segment 202 and the second ramp segment 204.

A time difference between start of transmission of the second ramp segment 204 and start of reception of the second received signal from the farthest obstacle of the one or more obstacles is represented as τ2 240 and equals the difference of t3 and t3'. From the time instant t3', the second VCO is assumed to be generating a steady second ramp segment 204. Similarly, τ1 238 is a time difference between start of transmission of the first ramp segment 202 and start of reception of the first received signal from the farthest obstacle of the one or more obstacles.

The ADC 112 samples the first IF signal from a time instant t1 230 to a time instant t2 232 and generates a first valid data. The ADC 112 samples the second IF signal from a time instant t3 234 to a time instant t4 236 to generate a second valid data. The synchronization block 114 provides a data valid signal to the ADC 112 during the sampling of the first IF signal and during the sampling of the second IF signal. Thus, the synchronization block 114 synchronizes the operation of the local oscillator 106 and the ADC 112.

The first valid data and the second valid data from the ADC 112 are provided to the DSP 116 for further processing. In one example, the second frequency fc2 212 of the first ramp segment 202 is equal to the first frequency fc2 212 of the second ramp segment 204. Depending on the velocity of the obstacle and the value of Tgap, there can be phase discontinuity between the first valid data and the second valid data. This phase discontinuity needs to be corrected. This phase discontinuity is given by:

$$\Delta\phi = \frac{4\pi f_{c1} v T_{gap}}{c} \quad (1)$$

where v is the velocity of the obstacle and c is the speed of light. It is evident from the above equation (1) that the phase discontinuity is dependent on the product of the velocity of the obstacle and Tgap. Hence, the DSP 116 compares a threshold and a product of a velocity estimate of the obstacle and the time difference between a time instant when the first ramp segment 202 is at the second frequency and a time instant when the second ramp segment 204 is at the start frequency (Tgap 224). This threshold is given as:

$$(v_{est} T_{gap})_{thresh} = \frac{\Delta\phi_{max} c}{4\pi f_{c1}} \quad (2)$$

where, $v_{est}$ is the velocity estimate of the obstacle with respect to the radar apparatus 100, $\Delta\phi_{max}$ is a maximum phase discontinuity that can be tolerated between the first IF signal and the second IF signal, and c is the velocity of light.

A value of $v_{est}*T_{gap}$ is compared to the threshold. The value of $v_{est}*T_{gap}$ is different for different applications. In one example, the value of Tgap is known apriori based on the design of the local oscillator 106. In another example, the maximum value of $v_{est}$ may also be known apriori based on the type of application. Alternatively, $v_{est}$ may also be dynamically estimated as described later in this description. In yet another example, the maximum phase discontinuity that can be tolerated by a specific application is ascertained and then the maximum value of $v_{est}*T_{gap}$ is computed for the specific application and compared to the threshold; the threshold being computed as illustrated in the above equation (2).

In one example, when second frequency fc2 212 of the first ramp segment 202 is equal to the first frequency fc2 212 of the second ramp segment 204, the DSP 116 performs at least one of a concatenation technique, a modified concatenation technique, a modified 1D-FFT (1-dimensional fast fourier transform) technique and a modified 2D-FFT (2-dimensional fast fourier transform) technique. In another example, when second frequency fc2 212 of the first ramp segment 202 is equal to the first frequency fc2 212 of the second ramp segment 204, the DSP 116 compares the threshold and the product of a velocity estimate of the obstacle and the time difference between the time instant the first ramp segment 202 is at the second frequency and the time instant when the second ramp segment 204 is at the start frequency.

When the product of the velocity estimate of the obstacle and the time difference (between the time instant when the first ramp segment 202 is at the second frequency and the time instant when the second ramp segment 204 is at the start frequency) is below the threshold, the DSP 116 performs the concatenation technique. When the product of the velocity estimate of the obstacle and the time difference (between the time instant when the first ramp segment 202 is at the second frequency and the time instant when the second ramp segment 204 is at the start frequency) is above the threshold, the DSP 116 is configured to performs at least one of the modified concatenation technique, the modified 1D-FFT technique and the modified 2D-FFT technique.

The concatenation technique, the modified concatenation technique, the modified 1D-FFT technique and the modified 2D-FFT technique are now described.

In the concatenation technique, the DSP 116 concatenates the first valid data and the second valid data to generate a concatenated data. The DSP 116 further performs fast fourier transform on the concatenated data to generate an FFT vector such that the FFT vector is processed to estimate range of the obstacle of the one or more obstacles. In an example, a plurality of first valid data and a plurality of second valid data are obtained when a plurality of the first ramp segments and a plurality of the second ramp segments are transmitted by the radar apparatus 100. Each transmission of the first ramp segment is being followed by a transmission of the second ramp segment. A 2D FFT (2 dimensional fast fourier transform) is performed on the obtained valid data to estimate both a range and relative velocity of the one or more obstacles.

Thus, for a specific application when the value of $v_{est}*Tgap$ is below the threshold, the DSP 116 is oblivious to the fact that the concatenated data was generated using multiple ramps segments and with a time difference between consecutive ramp segments. The DSP 116 processes the data as if it were a single contiguous ramp that the spans the bandwidth from fc1 210 to fc3 216. The DSP 116 processing is independent of the value of the time Tgap 224.

In the modified concatenation technique, the DSP 116 multiplies the second valid data with a complex phasor to generate a modified second valid data. The complex phasor is exp(−jΔφ) where Δφ is the phase discontinuity between the first IF signal and the second IF signal. The phase discontinuity Δφ is measured using equation 1, where v is a velocity estimate of the obstacle. The DSP 116 further concatenates the first valid data and the modified second valid data to generate a concatenated data and then performs fast fourier transform on the concatenated data to generate an FFT vector such that the FFT vector is processed to estimate a range of the obstacle of the one or more obstacles.

In the modified 1D-FFT technique, the DSP 116 performs fast fourier transform on the first valid data and the second valid data to generate a first FFT vector and a second FFT vector respectively. The first FFT vector and the second FFT vector each includes a plurality of elements. The DSP 116 multiplies each element of the plurality of elements of the second FFT vector with a complex phasor to generate a modified second FFT vector. A phase of the complex phasor is a function of an index of an element of the second FFT vector and $v_{est}$*Tgap.

The DSP 116 adds the modified second FFT vector and the first FFT vector to generate a single FFT vector such that the single FFT vector is processed to estimate a range of the obstacle of the one or more obstacles. This procedure is illustrated now with an example. We assume that $F_1^{2N}(m)$ and $F_2^{2N}(m)$ represents the first FFT vector and the second FFT vector respectively. N represents a number of samples in each of the first valid data and the second valid data. The superscript (2N) represents number of elements in the first FFT vector and the second FFT vector and m represents an index of an element of the corresponding FFT vector. Thus $F_1^{2N}(m)$ and $F_2^{2N}(m)$ represents the $m^{th}$ bin of the 2N point FFT of the N time domain samples of the first valid data and the second valid data respectively. Thereby, the single FFT vector is represented as:

$$F^{2N}(m) = F_1^{2N}(m) + e^{-j(\pi m + \Delta\phi_m)} F_2^{2N}(m); \quad 0 \leq m \leq 2N-1 \quad (3)$$

where $\Delta\phi_m$ is the phase discontinuity calculated for an obstacle with a range corresponding to the index m. The value of $\Delta\phi_m$ can be calculated using equation (1) with v being the velocity estimate of the obstacle with a range corresponding to the index m.

In the modified 2D-FFT technique, a transmit signal comprising the first ramp segment 202 and the second ramp segment 204 (shown in FIG. 2) is transmitted $N_v$ times in a frame, the repetition rate of the transmit signal being $1/T_r$. Each instance of the transmit signal results in a total of 2N valid ADC samples (N samples corresponding to the first valid data and N samples corresponding to the second valid data). A first $2N \times N_v$ point 2D FFT is performed on the $N \times N_v$ ADC samples corresponding to the first valid data across the $N_v$ transmissions.

The $N \times N_v$ ADC samples can be appropriately zero padded to create this FFT. The first 2D FFT array is denoted by $F_1^{2N,N_v}(n, n_v)$, where the superscript $(2N, N_v)$ denotes the dimensions of the FFT and $(n, n_v)$ are the index into the 2D FFT bins. Note that n ranges from 0 to 2N-1 and $n_v$ ranges from 0 to $N_v$-1. Similarly a second $2N \times N_v$ point 2D FFT is performed on the $N \times N_v$ ADC samples corresponding to the second valid data across the $N_v$ transmissions. The $N \times N_v$ ADC samples can be appropriately zero padded to create this FFT. The second 2D FFT array being denoted by $F_2^{2N,N_v}(n, n_v)$.

The first 2D FFT array and the second 2D FFT array each includes a plurality of elements arranged in a 2D matrix indexed by two indices $(n, n_v)$. Each element of the plurality of elements of the second 2D FFT array is multiplied with a complex phasor to generate a modified second 2D FFT array. The first 2D FFT array and the modified second 2D FFT array are then coherently added to generate a single 2D FFT array given as follows:

$$F^{2N,N_v}(n, n_v) = F_1^{2N,N_v}(n, n_v) + \alpha(n, n_v) F_2^{2N,N_v}(n, n_v) \quad (4)$$

where $\alpha(n, n_v) = e^{-\left(j\pi n + \frac{2\pi n_v T_{gap}}{T_r N_v}\right)}$ Thus in equation 4, each element in the second 2D FFT is multiplied by the complex phasor and is then added to the corresponding element in the first 2D FFT array to create a single 2D FFT array. A phase of the complex phasor is a function of the two indices and the time difference between the time instant when the first ramp segment 202 is at the second frequency and the time instant when the second ramp segment 204 is at the start frequency. This single 2D FFT array can then be processed to estimate the range and velocity of an obstacle of one or more obstacles. This technique does not require prior computation of the velocity estimate $v_{est}$, instead the velocity estimation is seamlessly incorporated into the 2D FFT process.

In another example, when the second frequency of the first ramp segment 202 is not equal to the first frequency of the second ramp segment 204, the DSP 116 concatenates the first valid data, a plurality of padding samples and the second valid data to generate a concatenated data. The DSP 116 performs fast fourier transform on the concatenated data to generate an FFT vector such that the FFT vector is processed to estimate a range of the obstacle It is to be noted that some of the described techniques require the velocity estimate '$v_{est}$' of the obstacles. The velocity estimate '$v_{est}$' of the obstacle with respect to the radar apparatus 100 is obtained using the following procedure. The local oscillator 106 generates a plurality of the first ramp segments. The transmit antenna unit 102 transmits the plurality of first ramp segments as a part of a frame. The plurality of the first ramp segments are scattered by the one or more obstacles to generate a plurality of a first received signals.

The receive antenna unit 104 receives a plurality of the first received signals. The receiver front-end 108 amplifies the plurality of the first received signals. The mixer 110 mixes the plurality of the first ramp segments and the plurality of the first received signals to generate a plurality of IF signals. The ADC 112 samples the plurality of IF signals. The DSP 116 performs 2D fast fourier transform (FFT) on the plurality of IF signals to obtain a coarse estimated of a range and a corresponding velocity estimate of the obstacle of the one or more obstacles. In an embodiment, the velocity estimate '$v_{est}$' is obtained by any of the techniques known in the art. It is to be noted, that the described method for velocity estimation uses the first ramp segment. However, other embodiments may use the second ramp segment instead. Yet other embodiments can use any ramp segment which is contiguously generated by the local oscillator 106.

In the concatenation technique the DSP 116 is oblivious to the fact that the concatenated data was generated using multiple VCO's that generates multiple ramps segments with a time difference between consecutive ramp segments. The DSP 116 processes the concatenated data as if the transmit signal was a single ramp from frequency fc1 210 to frequency fc2 216. Further, the modified concatenation, the modified 1D-FFT and the modified 2D-FFT techniques while not completely transparent, require only minimal changes in the DSP 116 as explained earlier.

It is understood that the above procedures are explained using an embodiment with the first ramp segment 202 and the second ramp segment 204 and it can be extended to a plurality of ramp segments by repeating the same procedures. Thus, the bandwidth of a transmitted signal from the radar apparatus 100 is increased by transmitting a plurality of ramp segments and thereby improving the range resolution of the radar apparatus 100 without being limited by the range of a single VCO or of a tuning element.

Further the embodiments used to generate the concatenated data are transparent to a signal processing software that resides on the DSP 116 and performs the radar signal processing. Hence, the signal processing software residing on the DSP 116 will require little or no customization in order to process ADC samples obtained using the above described embodiments. An important feature of the embodiment is that there is no need to maintain a phase continuity across the first ramp segment 202 generated from the first VCO and the second ramp segment 204 generated from the second VCO. This is explained in detail in the following paragraphs.

Figure 3:
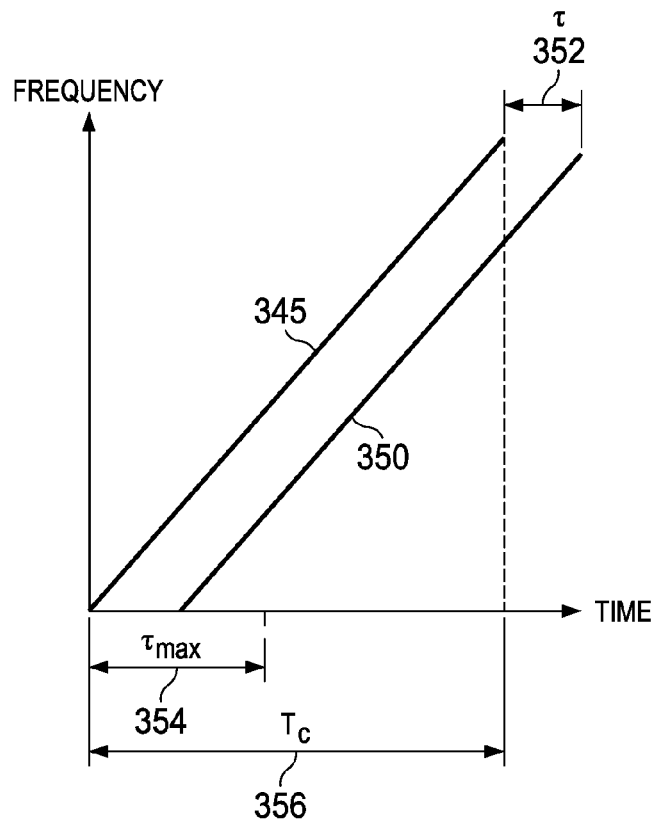
FIG. 3 illustrates waveforms generated and received by a radar apparatus, according to an embodiment.

FIG. 3 illustrates waveforms generated and received by a radar apparatus, according to an embodiment. The waveforms illustrated in FIG. 3 are illustrated in connection with the radar apparatus 100. A ramp segment 345 is transmitted by the radar apparatus 100 and a received signal 350 is received by the radar apparatus 100. The ramp segment 345 is scattered by one or more obstacles. The received signal 350 is generated by an obstacle of the one or more obstacles. The received signal 350, illustrated in FIG. 3, is also a ramp segment and represents a delayed version of the ramp segment 345. The ramp segment 345 has a slope S Hz/s, an initial frequency fc and an initial phase $\phi_o$. The phase of the ramp segment 345 is defined as:

$$\phi_{TX}(t) = 2\pi\left(f_c t + \frac{St^2}{2}\right) + \phi_o \quad (5)$$

A round trip delay ($\pi$) (352) is defined as a time difference between start of transmission of the ramp segment 345 and start of reception of the received signal 350 from the one or more obstacles. $\tau_{max}$ (354) is the maximum round trip delay and represents a time difference between start of transmission of the ramp segment 345 and start of reception of the received signal 350 from a farthest obstacle of the one or more obstacles. The farthest obstacle is an extreme obstacle which can be detected by the radar apparatus 100. The phase of the received signal 350 with the round trip delay of r seconds is defined as:

$$\phi_{RX}(t) = \phi_{TX}(t - \tau) = 2\pi\left(f_c(t-\tau) + \frac{S(t-\tau)^2}{2}\right) + \phi_o \quad (6)$$

The mixer 110 mixes the ramp segment 345 and the received signal 350 to generate an IF (intermediate frequency) signal. The phase of the IF signal is defined as:

$$\phi_{IF}(t) = \phi_{TX}(t) - \phi_{TX}(t-\tau) = 2\pi\left(f_c \tau - \frac{S\tau^2}{2}\right) + 2\pi S\tau t; (\tau_{max} < t < T_c) \quad (7)$$

A time Tc (356) defines the length or duration of the ramp segment 345. Now, equation 7 is used to evaluate the first ramp segment 202 and the second ramp segment 204 illustrated in FIG. 2. The phase of the IF signal corresponding to the first ramp segment 202 is defined as:

$$\phi_{IF1}(t) = \phi(t) - \phi(t-\tau) = 2\pi\left(f_{c0}\tau - \frac{S\tau^2}{2}\right) + 2\pi S\tau t \ (\tau_{max} < t < T_c) \quad (8)$$

Where fc0 208 is the start frequency of the first ramp segment 202. The phase of the IF signal corresponding to the second ramp segment 204 in terms of a variable t' is defined as:

$$\phi_{IF2}(t') = 2\pi\left(f_{c4}\tau - \frac{S\tau^2}{2}\right) + 2\pi S\tau t' \ (\tau_{max} < t' < T_c) \quad (9)$$

Where fc4 is the start frequency of the second ramp segment 204. Tc1 220 is equal to Tc2 222 and represented as Tc. Since the second ramp segment 204 follows the first ramp segment 202, t' is defined as:

$$t=t'+T_c+T_{gap}; \quad (10)$$

i.e; $t'=t-T_c-T_{gap}$ (11)

Replacing t' in equation 9:

$$\phi_{IF2}(t) = 2\pi\left(f_{c4}\tau - \frac{S\tau^2}{2}\right) + 2\pi S\tau(t - T_c - T_{gap}); \quad (12)$$

$$\{\tau_{max} + T_c + T_{gap} < t < 2T_c + T_{gap}\}$$

The start frequency fc4 of the second ramp segment 204 is defined as:

$$f_{c4}=f_{c0}+ST_c-S\tau_{max} \quad (13)$$

Replacing fc4 in equation 12:

$$\phi_{IF2}(t) = 2\pi\left(f_{c0}\tau - \frac{S\tau^2}{2} - S\tau\tau_{max}\right) + 2\pi S\tau(t - T_{gap}); \quad (14)$$

$$\{\tau_{max} + T_c + T_{gap} < t < 2T_c + T_{gap}\}$$

Equation 14 is further simplified and the following equation is obtained:

$$\phi_{IF2}(t) = 2\pi\left(f_{c0}\tau - \frac{S\tau^2}{2} - S\tau(\tau_{max} + T_{gap})\right) + 2\pi S\tau t; \quad (15)$$

$$\{\tau_{max} + T_c + T_{gap} < t' < 2T_c + T_{gap}\}$$

Comparing equation 8 and equation 15, we note that the frequency term ($2\pi S\tau t$) in the IF signal corresponding to the first ramp segment 202 is equal to the frequency term ($2\pi S\tau t$) in the IF signal corresponding to the second ramp segment 204. In addition, it is noted that the phase of the IF signal corresponding to the first ramp segment 202 at t=Tc is equal to the phase of the IF signal corresponding to the second ramp segment 204 at t=$\Sigma_{max}$+T$_c$+T$_{gap}$. Hence, both phase and frequency continuity is maintained from the first ramp segment 202 to the second ramp segment 204 and therefore both the IF signals (IF1 and IF2) can be seamlessly combined together. The above illustration assumes that the one or more obstacles are stationary with respect to the radar apparatus 100. In case an obstacle has a velocity v, then the phase discontinuity between the two IF signals is given by equation 1.

Figure 4:
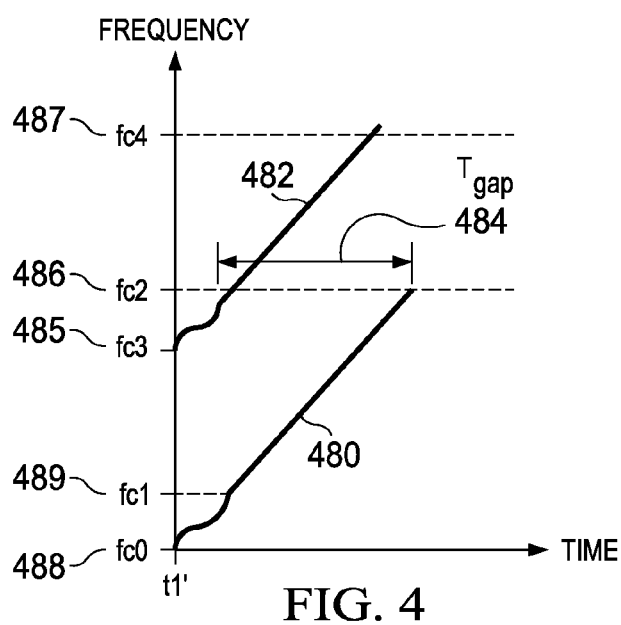
FIG. 4 illustrates waveforms generated by a local oscillator as a function of time, in a radar apparatus, according to an embodiment.

FIG. 4 illustrates waveforms generated by a local oscillator 106 as a function of time, in a radar apparatus, according to an embodiment. The waveforms illustrated in FIG. 4 are illustrated in connection with radar apparatus 100. The local oscillator 106 generates a plurality of ramp segments. The plurality of ramp segments includes a first ramp segment 480 and a second ramp segment 482.

The first ramp segment 480 and the second ramp segment 482 are generated at a same time instant t1'. In an example, the start of the second ramp segment 482 is before an end of the first ramp segment 480. A slope of the first ramp segment 480 is equal to a slope of the second ramp segment 482. In one example, the slope of the first ramp segment 480 is not equal to the slope of the second ramp segment 482.

In one version, the local oscillator 106 has a pair of PLL's (phase locked loop) that generates the first ramp segment 480 and the second ramp segment 482 simultaneously. In another version, the local oscillator 106 includes a first voltage controlled oscillator (VCO) and a second VCO that generates the first ramp segment 480 and the second ramp segment 482 simultaneously. In yet another version, the radar apparatus 100 includes two chips each having a VCO (or PLL) that generates the first ramp segment 480 and the second ramp segment 482 simultaneously.

Also, the radar apparatus 100 would include two ADCs and two mixers to process the received ramp signals simultaneously. The second ramp segment 482 has a start frequency fc3 485, a first frequency fc2 486 and a second frequency fc3 487. Similarly, the first ramp segment 480 has a start frequency fc0 488, a first frequency fc1 489 and a second frequency fc2 486. It is to be noted that the second frequency of the first ramp segment 480 is equal to the first frequency of the second ramp segment 482. In an example, the second frequency of the first ramp segment 480 is not equal to the first frequency of the second ramp segment 482.

The embodiment of FIG. 4 spans the same bandwidth as the embodiment depicted in FIG. 2. The processing techniques described earlier in the description for FIG. 2 and FIG. 3 are valid for the embodiment of FIG. 4 and hence are not included herein for the brevity of the description. However, in an embodiment, the Tgap 484 defined as a time difference between generation of the first ramp segment 480 and the second ramp segment 482 is a negative value, since the second ramp segment 482 starts prior to the ending of the first ramp segment 480 (i.e. the second ramp segment 482 attains its first frequency prior to the first ramp segment 480 attaining its second frequency). The embodiment of FIG. 4 allows both the ramp segments (the first ramp segment 480 and the second ramp segment 482) to be transmitted simultaneously, thus achieving the same resolution as the embodiment of FIG. 2 but in lesser time.

Figure 5:
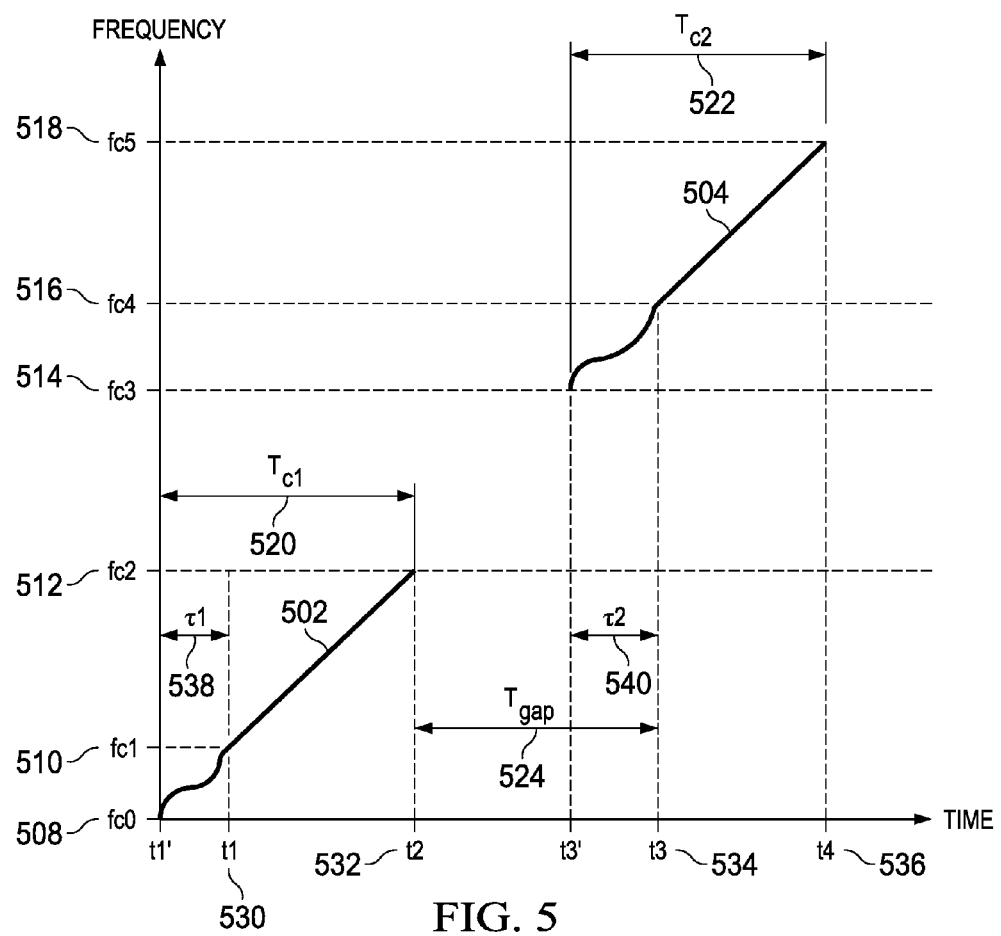
FIG. 5 illustrates waveforms generated by a local oscillator as a function of time, in a radar apparatus, according to an embodiment.

FIG. 5 illustrates waveforms generated by a local oscillator 106 as a function of time, in a radar apparatus, according to an embodiment. The waveforms illustrated in FIG. 5 are illustrated in connection with radar apparatus 100. The local oscillator 106 generates a plurality of ramp segments. The plurality of ramp segments includes a first ramp segment 502 and a second ramp segment 504. A slope of the first ramp segment 502 is equal to a slope of the second ramp segment 504.

In one example, the slope of the first ramp segment 502 is not equal to the slope of the second ramp segment 504. In an example, the local oscillator 106 includes a PLL (phase locked loop) that generates the first ramp segment 502 and the second ramp segment 504. The first ramp segment 502 has a start frequency fc0 508, a first frequency fc1 510 and a second frequency fc2 512. The second ramp segment 504 has a start frequency fc3 514, a first frequency fc4 516 and a second frequency fc5 518.

In one example, the local oscillator 106 includes a first voltage controlled oscillator (VCO) and a second VCO that generates the first ramp segment 502 and the second ramp segment 504 respectively. In another example, the local oscillator 106 includes a plurality of VCO's that generates a plurality of ramp segments. In yet another example, the local oscillator 106 includes a voltage controlled oscillator (VCO). The VCO includes a first tuning element and a second tuning element that generates the first ramp segment 502 and the second ramp segment 504 respectively.

In an example, a round trip delay is defined as a time difference between start of transmission of a ramp segment and receiving the corresponding start of received signal from an obstacle of the one or more obstacles. A maximum round trip delay is defined as a time difference between start of transmission of the first ramp segment 502 and start of reception of the first received signal from a farthest obstacle of the one or more obstacles. The farthest obstacle is an extreme obstacle which can be detected by the radar apparatus 100.

The start frequency is less than the first frequency by at least a product of an absolute value of the slope of the first ramp segment 502 and the maximum round trip delay when the slope of the first ramp segment 502 and the second ramp segment 504 are equal and positive. The start frequency is greater than the first frequency by at least a product of an absolute value of the slope of the first ramp segment 502 and the maximum round trip delay when the slope of the first ramp segment 502 and the second ramp segment 504 are equal and negative.

The time Tc1 520 defines a duration of the first ramp segment 502 and the time Tc2 522 defines a duration of the second ramp segment 504. In an embodiment, Tc1 520 is equal to Tc2 522. The time Tgap 524 includes a time taken in the local oscillator 106 to switch from the first VCO to the second VCO or to switch from the first tuning element to the second tuning element. In an example, the time Tgap 524 includes a time required for the local oscillator 106 to settle after switching from the first VCO to the second VCO or from the first tuning element to the second tuning element. The time Tgap 524 also represents a time difference between generation of the first ramp segment 502 and the second ramp segment 504.

A time difference between start of transmission of the second ramp segment 504 and start of reception of the second received signal from the farthest obstacle of the one or more obstacles is represented as τ2 540 and equals the difference of t3 and t3'. From the time instant t3 534, the second VCO is assumed to be generating a steady second ramp segment 504. Similarly, τ1 538 is a time difference between start of transmission of the first ramp segment 502 and start of reception of the first received signal from the farthest obstacle of the one or more obstacles.

A difference between the second frequency fc2 512 of the first ramp segment 502 and the first frequency fc4 516 of the second ramp segment 504 is equal to a product of a slope (S) of the first ramp segment 502 and a time difference between the time instant when the first ramp segment 502 is at the second frequency and the time instant when the second ramp segment 504 is at the first frequency.

$$f_{c4} = f_{c2} + S(T_{gap}) \quad (16)$$

The ADC 112 samples the first IF signal from a time instant t1 530 to a time instant t2 532 and generates a first valid data. The ADC 112 samples the second IF signal from a time instant t3 534 to a time instant t4 536 to generate a second valid data. The synchronization block 114 provides a data valid signal to the ADC 112 during the sampling of the first IF signal and during the sampling of the second IF signal. Thus, the synchronization block 114 synchronizes the operation of the local oscillator 106 and the ADC 112. The first valid data and the second valid data from the ADC are provided to the DSP 116 for further processing.

As the difference between the second frequency fc2 512 of the first ramp segment 502 and the first frequency fc4 516 of the second ramp segment 504 is equal to a product of a slope (S) of the first ramp segment 502 and a time difference between generation of the first ramp segment 502 and the second ramp segment 504, the DSP 116 concatenates the first valid data, a plurality of padding samples and the second valid data to generate a concatenated data.

A number of padding samples in the plurality of padding samples is equal to a product of a sampling rate of the ADC 112 and the time difference between the time instant when the first ramp segment 502 is at the second frequency and the time instant when the second ramp segment 504 is at the first frequency. In one example, a value of each padding sample in the plurality of padding samples is zero. In another example, the number of padding samples in the plurality of padding samples is a function of a product of a sampling rate of the ADC 112 and the time difference between the time instant when the first ramp segment 502 is at the second frequency and the time instant when the second ramp segment 504 is at the first frequency.

The DSP 116 further performs fast fourier transform on the concatenated data to generate an FFT vector such that the FFT vector is processed to estimate a range of the obstacle of the one or more obstacles. In one version, a plurality of first valid data and a plurality of second valid data is obtained when a plurality of the first ramp segments and a plurality of the second ramp segments are transmitted by the radar apparatus i.e. the transmission being in an interleaved manner with every transmission of the first ramp segment 502 being followed by a transmission of the second ramp segment 504 (as illustrated in FIG. 5). A 2D FFT (2 dimensional fast fourier transform) is performed on the obtained valid data to estimate velocity of the one or more obstacles.

The DSP 116 is oblivious to the fact that the concatenated data was generated using multiple VCO's that generates multiple ramps segments with a time difference between consecutive ramp segments. The DSP 116 processes the concatenated data as if the transmit signal was a single ramp from frequency fc1 510 to frequency fc5 518. It is understood that the above procedure is explained using an embodiment with the first ramp segment 502 and the second ramp segment 504 and it can be extended to a plurality of ramp segments by repeating the same procedure.

Thus, the bandwidth of a transmitted signal from the radar apparatus 100 is increased by transmitting a plurality of ramp segments and thereby improving the range resolution of the radar apparatus 100 without being limited by the range of a single VCO or of a tuning element. Further the embodiments used to generate the concatenated data are transparent to a signal processing software that resides on the DSP 116 and performs the radar signal processing.

Importantly the FFT processing (including 2D FFT processing) on the DSP 116 will be independent of the time Tgap 524 between the ramp segments and will operate as if a single ramp from fc1 510 to fc5 518 were transmitted by the local oscillator 106. Hence, the signal processing software residing on the DSP 116 will require little or no customization in order to process ADC samples obtained using the above described embodiments. However, it should be noted that depending on the length of the time Tgap 524 between the ramp segments, there can be side-lobes introduced in the spectrum after FFT processing. Thus, the detection processes that follow the FFT processing must be cognizant of this fact.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A radar apparatus comprising:
a local oscillator configured to generate a first ramp segment and a second ramp segment, a slope of the first ramp segment and a slope of the second ramp segment are equal and positive, and wherein, the first ramp segment and the second ramp segment each comprising a start frequency, a first frequency and a second frequency, and wherein the first frequency of the second ramp segment is equal to or greater than the second frequency of the first ramp segment;
a transmit antenna unit coupled to the local oscillator and configured to transmit the first ramp segment and the second ramp segment;
a receive antenna unit configured to receive a first received signal and a second received signal, wherein the first ramp segment and the second ramp segment are scattered by one or more obstacles to generate the first received signal and the second received signal respectively;
a receiver front-end coupled to the receive antenna unit and configured to amplify the first received signal and the second received signal;
a mixer coupled to the receiver front-end and configured to mix the first ramp segment and the first received signal to generate a first IF (intermediate frequency) signal and configured to mix the second ramp segment and the second received signal to generate a second IF signal;
an analog to digital converter (ADC) coupled to the mixer and configured to sample the first IF signal to generate a first valid data and configured to sample the second IF signal to generate a second valid data; and
a digital signal processor (DSP) coupled to the ADC and configured to process a data formed from the first valid data and the second valid data;
wherein the ADC is configured to sample the first IF signal only from a time instant when the first ramp segment is at the first frequency to a time instant when the first ramp segment is at the second frequency and configured to sample the second IF signal only from a time instant when the second ramp segment is at the first frequency to a time instant when the second ramp segment is at the second frequency.

2. The radar apparatus of claim 1, wherein the start frequency of the first ramp segment is less than the first frequency of the first ramp segment by at least a product of the slope of the first ramp segment and a maximum round trip delay, wherein a time difference between start of transmission of the first ramp segment and start of reception of the first received signal from a farthest obstacle of the one or more obstacles is the maximum round trip delay.

3. The radar apparatus of claim 1, wherein the local oscillator further comprises a plurality of voltage controlled oscillators (VCO's) configured to generate a plurality of ramp segments, the plurality of ramp segments includes the first ramp segment and the second ramp segment, and wherein a time difference between the time instant when the first ramp segment is at the second frequency and a time instant when the second ramp segment is at the start frequency is equal to a time difference between generation of the first ramp segment and the second ramp segment by the local oscillator.

4. The radar apparatus of claim 1, wherein a start of the second ramp segment is before an end of the first ramp segment.

5. The radar apparatus of claim 1, further comprising a synchronization block coupled to the local oscillator and to the ADC, the synchronization block configured to provide a data valid signal to the ADC during sampling of the first IF signal and during sampling of the second IF signal.

6. The radar apparatus of claim 1, wherein the DSP is configured to process the data formed from the first valid data and the second valid data using at leas tone of a concatenation technique, a modified concatenation technique, a modified 1D-FFT technique and a modified 2D-FFT technique, when the second frequency of the first ramp segment is equal to the first frequency of the second ramp segment.

7. The radar apparatus of claim 6, wherein the DSP is configured to compare a threshold and a product of a velocity estimate of an obstacle of the one or more obstacles and the time difference between the time instant when the first ramp segment is at the second frequency and the time instant when the second ramp segment is at the start frequency.

8. The radar apparatus of claim 7, wherein:
when the product of the velocity estimate of the obstacle and the time difference between the time instant when the first ramp segment is at the second frequency and the time instant when the second ramp segment is at the start frequency is below the threshold, the DSP is configured to perform the concatenation technique; and
when the product of the velocity estimate of the obstacle and the time difference between the time instant when the first ramp segment is at the second frequency and the time instant when the second ramp segment is at the start frequency is above the threshold, the DSP is configured to perform at least one of the modified concatenation technique, the modified 1D-FFT technique and the modified 2D-FFT technique.

9. The radar apparatus of claim 7, wherein in the modified 1D-FFT (1-dimensional fast fourier transform) technique, the DSP is configured to:
perform fast fourier transform on the first valid data and the second valid data to generate a first FFT vector and a second FFT vector respectively, the first FFT vector and the second FFT vector each comprising a plurality of elements;
multiply each element of the plurality of elements of the second FFT vector with a complex phasor to generate a modified second FFT vector, wherein a phase of the complex phasor is a function of an index of an element of the second FFT vector and the product of the velocity estimate of the obstacle and the time difference between the time instant when the first ramp segment is at the second frequency and the time instant when the second ramp segment is at the start frequency; and
add the modified second FFT vector and the first FFT vector to generate a single FFT vector such that the single FFT vector is processed to estimate the range of the obstacle.

10. The radar apparatus of claim 7, wherein to obtain the velocity estimate of the obstacle:
the local oscillator is configured to generate a plurality of the first ramp segments;
the transmit antenna unit is configured to transmit the plurality of first ramp segments;
the receive antenna unit is configured to receive a plurality of first received signals, wherein the plurality of the first ramp segments are scattered by the one or more obstacles to generate a plurality of the first received signals;
the mixer is configured to mix the plurality of the first ramp segments and the plurality of the first received signals to generate a plurality of IF signals;
the ADC is configured to sample the plurality of IF signals; and
the DSP is configured to perform fast fourier transform (FFT) on the plurality of IF signals.

11. The radar apparatus of claim 6, wherein in the concatenation technique, the DSP is configured to:
concatenate the first valid data and the second valid data to generate a concatenated data; and
perform fast fourier transform (FFT) on the concatenated data to generate an FFT vector such that the FFT vector is processed to estimate a range of an obstacle.

12. The radar apparatus of claim 6, wherein in the modified concatenation technique, the DSP is configured to:
multiply second valid data with a complex phasor to generate a modified second valid data;
concatenate the first valid data and the modified second valid data to generate a concatenated data; and
perform fast fourier transform on the concatenated data to generate an FFT vector such that the FFT vector is processed to estimate a range of an obstacle.

13. The radar apparatus of claim 6, wherein in the modified 2D-FFT (2-dimensional fast fourier transform) technique, the DSP is configured to:
perform a zero padded 2D-FFT (2-dimensional fast fourier transform) on a plurality of the first valid data and on a plurality of the second valid data to generate a first 2D FFT array and a second 2D FFT array respectively, the first 2D FFT array and the second 2D FFT array each comprising a plurality of elements arranged in a 2D matrix indexed by two indices and, wherein the plurality of the first valid data is obtained from a plurality of the first ramp segments and the plurality of the second valid data is obtained from a plurality of the second ramp segments;
multiply each element of the plurality of elements of the second 2D FFT array with a complex phasor to generate a modified second 2D FFT array, wherein a phase of the complex phasor is a function of the two indices and the time difference between the time instant when the first ramp segment is at the second frequency and the time instant when the second ramp segment is at the start frequency; and
add the modified second 2D FFT array and the first 2D FFT array to generate a single 2D FFT array such that the single 2D FFT array is processed to estimate a range and velocity of the one or more obstacles.

14. The radar apparatus of claim 1, wherein the second frequency of the first ramp segment is not equal to the first frequency of the second ramp segment, and the DSP is configured to:
concatenate the first valid data, a plurality of padding samples and the second valid data to generate a concatenated data; and
perform fast fourier transform on the concatenated data to generate an FFT vector such that the FFT vector is processed to estimate a range of an obstacle.

15. The radar apparatus of claim 1, wherein a difference between the second frequency of the first ramp segment and the first frequency of the second ramp segment is equal to a product of the slope of the first ramp segment and the time difference between the time instant when the first ramp segment is at the second frequency and the time instant when the second ramp segment is at the first frequency, and the DSP is configured to:
concatenate the first valid data, a plurality of padding samples and the second valid data to generate a concatenated data; and
perform fast fourier transform on the concatenated data to generate an FFT vector such that the FFT vector is processed to estimate a range of an obstacle.

16. The radar apparatus of claim 15, wherein a number of padding samples in the plurality of padding samples is equal to a product of a sampling rate of the ADC and the time difference between the time instant when the first ramp segment is at the second frequency and the time instant when the second ramp segment is at the first frequency.

17. The radar apparatus of claim 15, wherein a value of each padding sample in the plurality of padding samples is zero.

18. A method comprising: transmitting a first ramp segment and a second ramp segment, a slope of the first ramp segment and a slope of the second ramp segment are equal and positive, and wherein the first ramp segment and the second ramp segment each comprise a start frequency, a first frequency and a second frequency, and wherein the first frequency of the second ramp segment is equal to or greater than the second frequency of the first ramp segment;
scattering the first ramp segment and the second ramp segment by one or more obstacles to generate a first received signal and a second received signal respectively;
mixing the first ramp segment and the first received signal to generate a first IF (intermediate frequency) signal and mixing the second ramp segment and the second received signal to generate a second IF signal;
sampling the first IF signal in an analog to digital converter (ADC) to generate a first valid data and sampling the second IF signal to generate a second valid data; and
processing a data formed from the first valid data and the second valid data,
wherein the first IF signal is sampled only from a time instant when the first ramp segment is at the first frequency to a time instant when the first ramp segment is at the second frequency and the second IF signal is sampled only from a time instant when the second ramp segment is at the first frequency to a time instant when the second ramp segment is at the second frequency.

19. The method of claim 18, wherein the start frequency of the first ramp segment is less than the first frequency of the first ramp segment by at least a product of the slope of the first ramp segment and a maximum round trip delay and wherein a time difference between start of transmission of the first ramp segment and start of reception of the first received signal from a farthest obstacle of the one or more obstacles is the maximum round trip delay.

20. The method of claim 18, wherein the second frequency of the first ramp segment is equal to the first frequency of the second ramp segment and the method further comprises performing a concatenation technique, the concatenation technique comprising:
concatenating the first valid data and the second valid data to generate a concatenated data; and
performing fast fourier transform (FFT) on the concatenated data to generate an FFT vector, wherein the FFT vector is processed to estimate a range of an obstacle.

21. The method of claim 18, wherein the second frequency of the first ramp segment is equal to the first frequency of the second ramp segment and the method further comprises performing a modified concatenation technique, the modified concatenation technique comprising:
multiplying the second valid data with a complex phasor to generate a modified second valid data;
concatenating the first valid data and the modified second valid data to generate a concatenated data; and performing fast fourier transform on the concatenated data to generate an FFT vector, wherein the FFT vector is processed to estimate a range of an obstacle.

22. The method of claim 18, wherein the second frequency of the first ramp segment is equal to the first frequency of the second ramp segment and the method further comprises performing a modified 1D-FFT technique, the modified 1D-FFT technique comprising:
performing fast fourier transform on the first valid data and the second valid data to generate a first FFT vector and a second FFT vector respectively, the first FFT vector and the second FFT vector each comprising a plurality of elements;
multiplying each element of the plurality of elements of the second FFT vector with a complex phasor to generate a modified second FFT vector, wherein a phase of the complex phasor is a function of an index of an element of the second FFT vector and the product of a velocity estimate of the obstacle and a time difference between the time instant when the first ramp segment is at the second frequency and the time instant when the second ramp segment is at the first frequency; and
adding the modified second FFT vector and the first FFT vector to generate a single FFT vector, wherein the single FFT vector is processed to estimate a range of an obstacle.

23. The method of claim 18, wherein the second frequency of the first ramp segment is equal to the first frequency of the second ramp segment and the method further comprises performing a modified 2D-FFT technique, the modified 2D-FFT technique comprising:
performing a zero padded 2D-FFT (2-dimensional fast fourier transform) on a plurality of the first valid data and on a plurality of the second valid data to generate a first 2D FFT array and a second 2D FFT array respectively, the first 2D FFT array and the second 2D FFT array each comprising a plurality of elements arranged in a 2D matrix indexed by two indices and, wherein the plurality of the first valid data is obtained from a plurality of the first ramp segments and the plurality of the second valid data is obtained from a plurality of the second ramp segments;
multiplying each element of the plurality of elements of the second 2D FFT array with a complex phasor to generate a modified second 2D FFT array, wherein a phase of the complex phasor is a function of the two indices and the time difference between the time instant when the first ramp segment is at the second frequency and the time instant when the second ramp segment is at the first frequency; and
adding the modified second 2D FFT array and the first 2D FFT array to generate a single 2D FFT array, wherein the single 2D FFT array is processed to estimate a range and velocity of one or more obstacles.

24. The method of claim 18, wherein when the difference between the second frequency of the first ramp segment and the first frequency of the second ramp segment is equal to a product of the slope of the first ramp segment and the time difference between the time instant when the first ramp segment is at the second frequency and the time instant when the second ramp segment is at the first frequency, the method further comprising:
concatenating the first valid data, a plurality of padding samples and the second valid data to generate a concatenated data; and
performing fast fourier transform on the concatenated data to generate an FFT vector such that the FFT vector is processed to estimate a range of an obstacle.

25. The method of claim 24, wherein a number of padding samples in the plurality of padding samples is equal to a product of a sampling rate of the ADC and the time difference between the time instant when the first ramp segment is at the second frequency and the time instant when the second ramp segment is at the first frequency and, wherein a value of each sample in the plurality of padding samples is zero.

* * * * *